(12) United States Patent
Houx (10) Patent No.: US 11,154,033 B2
(45) Date of Patent: Oct. 26, 2021

(54) ATTRACTANT PET FOOD CONTAINER

(71) Applicant: Sam R Houx, La Habra, CA (US)

(72) Inventor: Sam R Houx, La Habra, CA (US)

( * ) Notice: Subject to any disclaimer, the term of this patent is extended or adjusted under 35 U.S.C. 154(b) by 200 days.

(21) Appl. No.: 16/563,889

(22) Filed: Sep. 8, 2019

(65) Prior Publication Data

US 2020/0077621 A1 Mar. 12, 2020

Related U.S. Application Data

(60) Provisional application No. 62/729,506, filed on Sep. 11, 2018.

(51) Int. Cl.
*A01K 5/01* (2006.01)

(52) U.S. Cl.
CPC .................. *A01K 5/0114* (2013.01)

(58) Field of Classification Search
CPC .. A01K 1/0356; A01K 5/0114; A01K 5/0291; A01K 5/0135; A01K 5/0142
See application file for complete search history.

(56) References Cited

U.S. PATENT DOCUMENTS

| | | | | |
|---|---|---|---|---|
| 3,268,198 A | * | 8/1966 | Swett | A47G 19/2283 248/346.11 |
| 4,942,277 A | * | 7/1990 | Narberes | B65D 81/3453 209/235 |
| 5,377,621 A | * | 1/1995 | Camm | A01K 5/0114 119/61.54 |
| 6,135,307 A | * | 10/2000 | Fahy | A47G 19/02 220/521 |
| 6,314,911 B1 | * | 11/2001 | Kaytovich | A01K 5/0114 119/61.5 |
| 7,913,648 B2 | * | 3/2011 | Maeda | A01K 7/027 119/61.52 |
| D716,003 S | * | 10/2014 | Brown | D30/129 |
| D767,952 S | * | 10/2016 | Ioncescu | D7/647 |
| D853,053 S | * | 7/2019 | O'Donnell | A01K 15/025 D30/129 |
| 2003/0106262 A1 | * | 6/2003 | Lai | A01G 27/02 47/65.6 |
| 2007/0199512 A1 | * | 8/2007 | Ellis | A01K 7/005 119/61.54 |
| 2009/0050633 A1 | * | 2/2009 | Knapp | A47G 19/02 220/575 |
| 2011/0088310 A1 | * | 4/2011 | Parker | A01M 1/2011 43/131 |
| 2012/0017837 A1 | * | 1/2012 | Crawford | A01K 5/01 119/61.1 |
| 2012/0090549 A1 | * | 4/2012 | Tharp | A01K 5/01 119/51.5 |
| 2014/0060442 A1 | * | 3/2014 | Ressemann | A01K 13/00 119/61.5 |
| 2014/0158054 A1 | * | 6/2014 | Clarke | A01K 5/00 119/51.01 |
| 2017/0127647 A1 | * | 5/2017 | Owens, III | A01K 5/0114 |

* cited by examiner

*Primary Examiner* — Ebony E Evans (57) ABSTRACT

One embodiment includes a pet food container that includes an upper bowl portion, a lower bowl connected with the upper bowl portion, and an inner base portion connected between the upper bowl portion and the lower bowl. The inner base portion includes multiple openings.

19 Claims, 7 Drawing Sheets

ATTRACTANT PET FOOD CONTAINER

CROSS-REFERENCE TO RELATED APPLICATIONS

The present application claims priority to U.S. Provisional Patent Application No. 62/729,506, filed on Sep. 11, 2018, hereby incorporated by reference in its entirety.

TECHNICAL FIELD

One or more embodiments relate generally to pet food containers, and in particular, to pet food containers including an attractant compartment within the pet container.

BACKGROUND

Household pets are often particular to what they eat. Many times pets do not eat regular (dry) pet food, which causes pet owners to spend money catering to their pet's individual food preferences. Companies have attempted to solve this problem by adding various additives to pet foods in an attempt to make them more appealing to the pets.

SUMMARY

Embodiments relate to pet food containers (e.g., dishes, bowls, etc.) for serving pet food. One embodiment includes a pet food container that includes an upper bowl portion, a lower bowl connected with the upper bowl portion, and an inner base portion connected between the upper bowl portion and the lower bowl. The inner base portion includes multiple openings.

Another embodiment provides a pet food container comprising an upper bowl portion including an inner base portion. The inner base portion including a plurality of openings. A lower bowl is removably coupled with the upper bowl portion.

Yet another embodiment provides a pet food container comprising an upper bowl portion including an inner base portion. The inner base portion including a plurality of openings. The plurality of openings form one or more words or a design shape. A lower bowl is removably coupled with the upper bowl portion. A footing portion is coupled to the upper bowl portion.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate to pet food bowls or dishes. One embodiment includes a pet food container including a plurality of openings (e.g., through-holes, slots, grooves, channels, or a combination thereof, etc.) and a concealed aromatic or attractant compartment that provides for the storage of various food attractant items, which is inaccessible by direct access by an animal.

One or more embodiments, appear, when viewed, to be a typical pet food bowl. When the hidden compartment is filled with an enticing aroma from treats or other attractant food, the pet is attracted to the scent and eats the food placed in the bowl.

Figure 1:
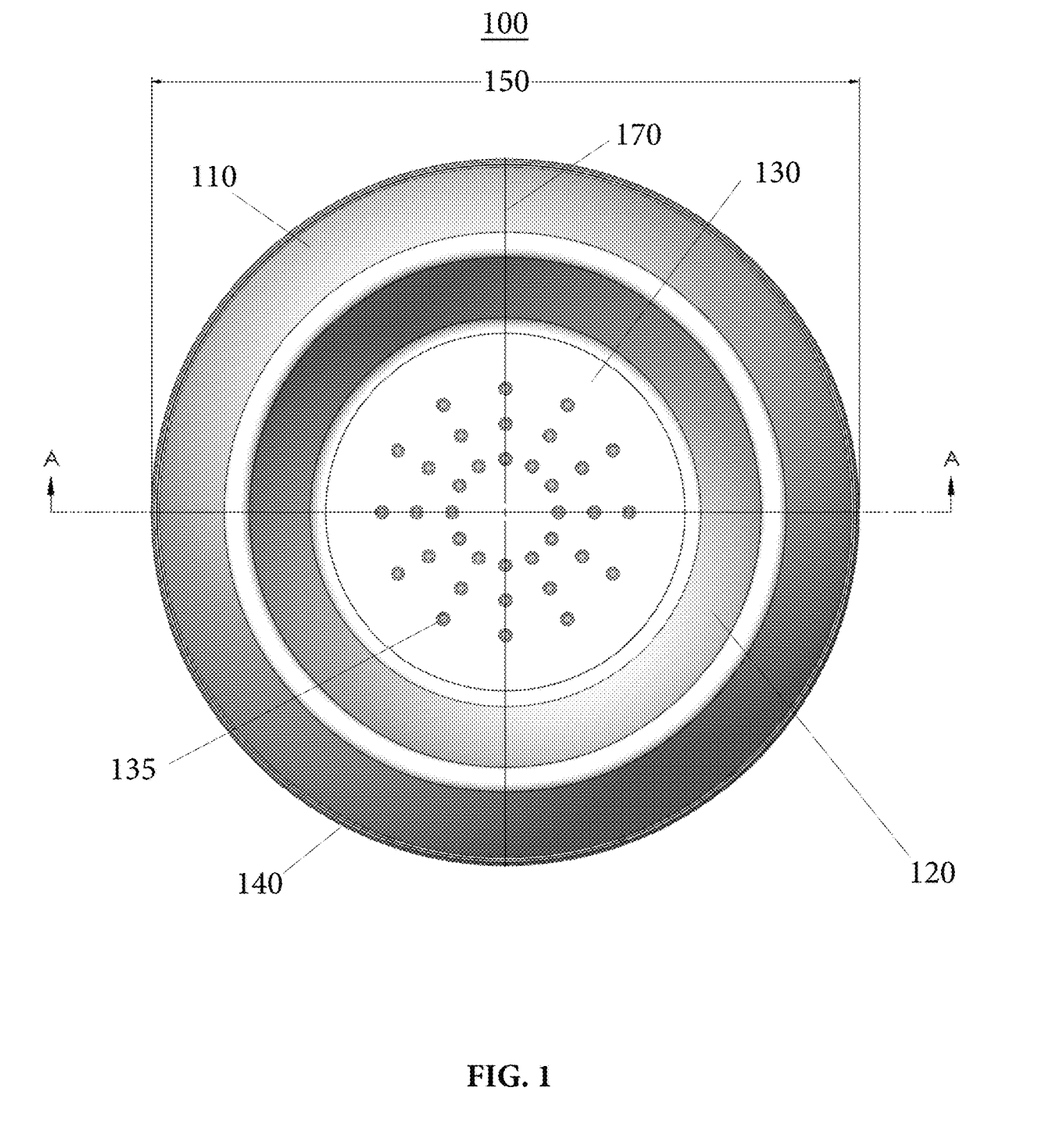
FIG. 1 is a is a top view of a pet food container, according to one embodiment.

FIG. 1 is a top view of a pet food container 100 (e.g., bowl, dish, etc.), according to one embodiment. In one embodiment, the pet food container 100 may be a two-piece aromatic pet food bowl. In this embodiment, the upper (bowl) portion (including the outer container portion 110, inner container portion 120 and footing portion 140) has the appearance of a normal pet food bowl (e.g., a round food bowl), with the openings 135 (e.g., through-holes, perforations, slots, grooves, channels, etc.) in its inner base portion (or cover) 130. Underneath the upper portion, the lower portion 310 (FIG. 3) attaches (e.g., small bowl (e.g., round, square, oval, etc.)), creating a hidden lower compartment 430 (FIG. 4) beneath the upper portion of the pet food container 100. In one example, dry pet food may be placed in the inner container portion 120 of the upper portion of the pet food container 100, where treats and other food items may be concealed in the hidden lower compartment 430. This provides for the scent of the treat/food product to travel through the openings 135 to the upper portion from the hidden lower compartment 430. The scent from the hidden lower compartment 430 compartment entices or attracts the pet to the pet food container 100, and in turn causes the pet to consume the dry/normal pet food in the inner container portion 120.

In one embodiment, the pet food container 100 may be any shape (e.g., oval, square, polygonal, "dog-bone" shaped, heart shaped, etc.) and may have different sizes (e.g., small, medium, large, extra-large, etc.) for different sized pets (and the lower portion of the pet food container is sized accordingly). In one example embodiment, the upper portion of the pet food container 100 has a width 150 of 10 inches wide and 4.5 inches tall, and the lower portion 310 (see, e.g., FIG. 5) is 1.87 inches tall and 6.75 inches wide. It should be noted that the dimensions may vary depending on the size and shape of the pet food container 100.

In one embodiment, the openings 135 may include different or similar/same sized openings that maintain the food in the upper portion of the pet food container 100 such that the food in the upper portion of the pet food container 100 does not fit through the openings 135. In some embodiments, the openings 135 may be arranged in any pattern (e.g., to spell out a pet's name, to spell out a store's name (e.g., PETCO®, PET SMART®, PET VALU, etc.), to have a particular design shape (e.g., a dog-bone shape, a heart shape, etc.), a logo, one or more literal elements (e.g., a saying, one or more words, one or more pet names, etc. In some embodiments, the inner base portion 130 may be molded as part of the upper portion of the pet food container 100. In other embodiments, the inner base portion 130 may be removable or replaceable.

In one embodiment, the openings 135 holes may be on the side-walls of the inner container portion 120 of the pet food container 100 and the hidden lower compartment 430 may be within (i.e., internal to) the side-walls of the upper portion of the pet food container 100. In this embodiment, the attractant may be spread around the internal portion and liquid is not able to enter the openings 135 as easily as it would in the embodiments having the openings 135 on the inner base portion 130 of the upper portion of the pet food container 100. In yet another embodiment, the openings 135 are disposed on the top portion of the pet food container 100 providing an attractant scent around the top of the pet food container. In still another embodiment, a universal serial bus (USB) rechargeable battery or battery may power a small waterproof fan to assist in spreading the aroma of the attractant placed in the hidden lower compartment 430. In one example, the fan may be turned on/off via a switch, a motion sensor, a remote-control, etc. Known technology may be used for the fan, sensors, remote control, etc. In some embodiments, the openings 135 may be adjusted with an adjustable plate or cover that provides for full or partial blocking of the openings 135.

In one embodiment, the pet food container 100 may be made out of polyethylene, ceramic material, metal, metal alloys, hardened plastic, other sanitary and safe material (i.e., not harmful if eaten by a pet) for pets, etc. In other embodiments, the pet food container 100 may be made of other material, such as canvas, nylon, food grade silicone (BPA-free), fabric, etc., such that the pet food container 100 is collapsible or foldable and includes a hidden compartment that may be opened/closed with a fastener, such as a zipper, snaps, slide seal, etc.

Figure 2:
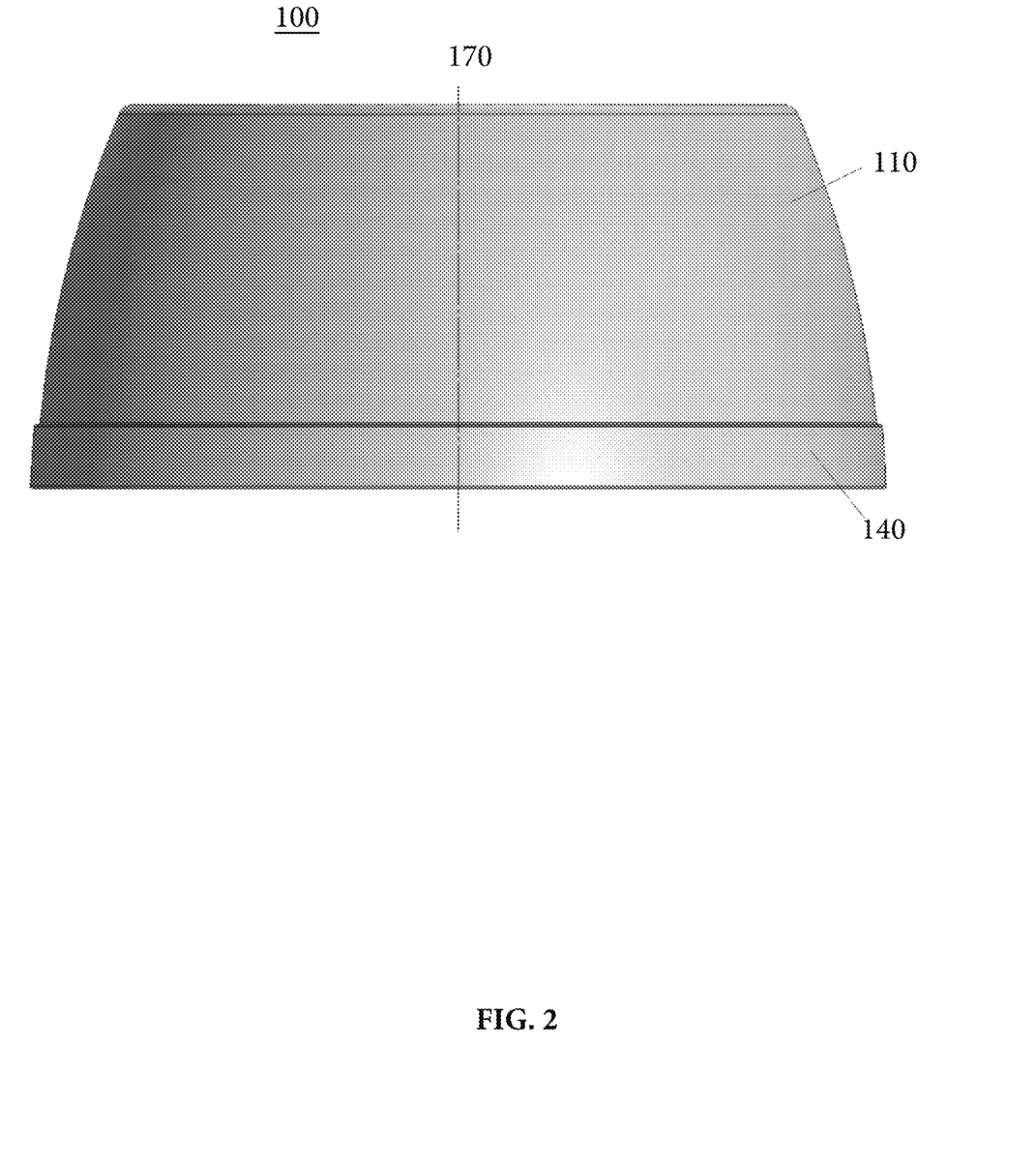
FIG. 2 is a side view of the pet food container, according to one embodiment.

FIG. 2 is a side view of the pet food container 100, according to one embodiment. In one embodiment, the footing portion 140 may be covered with a gripping material, such as rubber, silicone, etc. to reduce or prevent the pet food container 100 from sliding or moving on a surface (e.g., a floor, table, etc.). In some embodiments, the footing portion 140 is removable and replaceable. In other embodiments, the footing portion 140 is integrated with the outer container portion 110. The vertical axis 170 is shown as a center axis of the pet food container 100.

Figure 3:
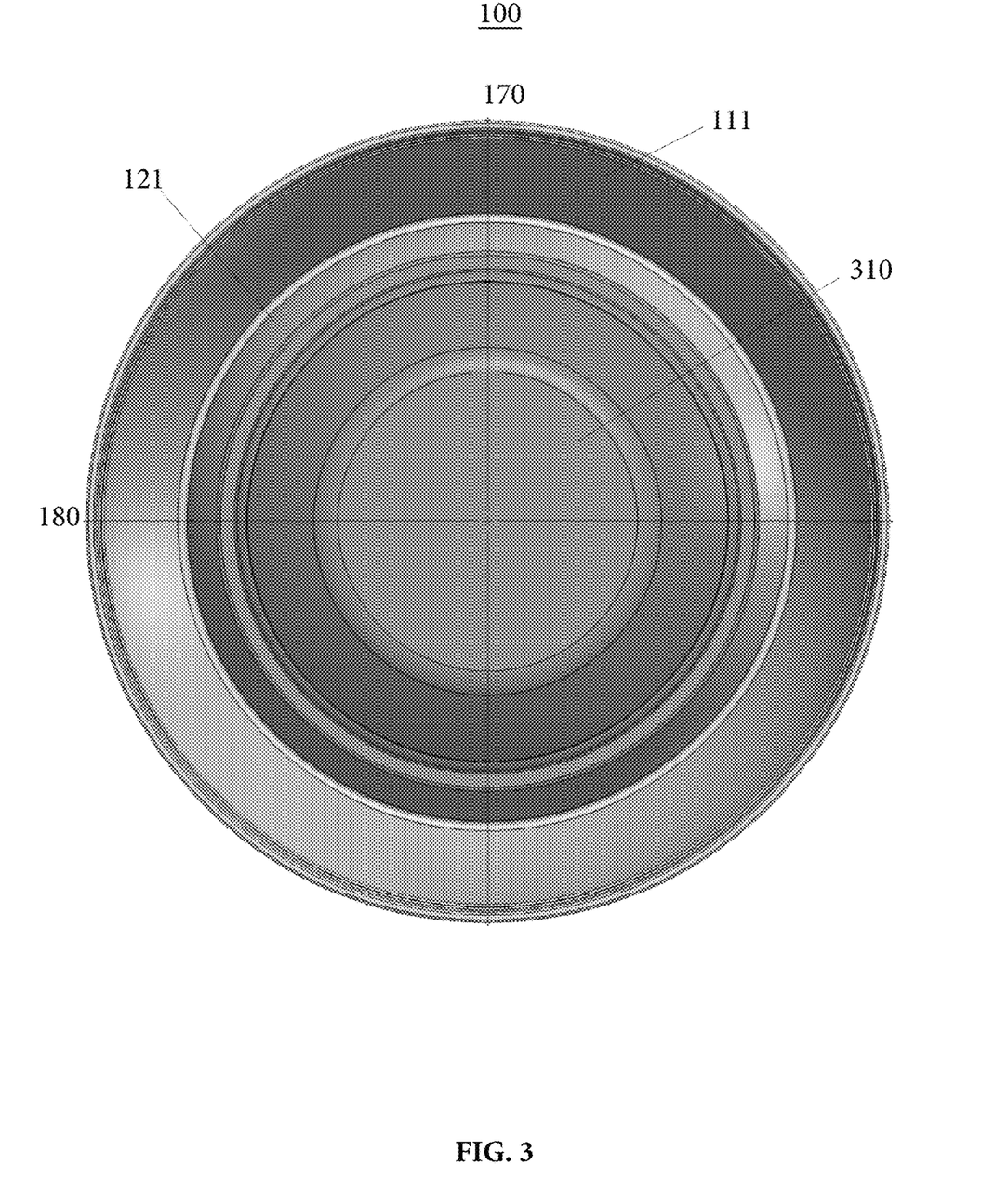
FIG. 3 is a bottom view of the pet food container, according to one embodiment.

FIG. 3 is a bottom view of the pet food container 100, according to one embodiment. In some embodiments, the horizontal axis 180 intersects the vertical axis 170, where the point of intersection is shown as the center of the pet food container 100. In this view, the lower portion 310 can be seen as being disposed on the underside 121 of the inner container portion 120 (FIG. 1). The inner container portion 111 is shown as the underside of the outer container portion 110 (FIG. 1).

Figure 4:
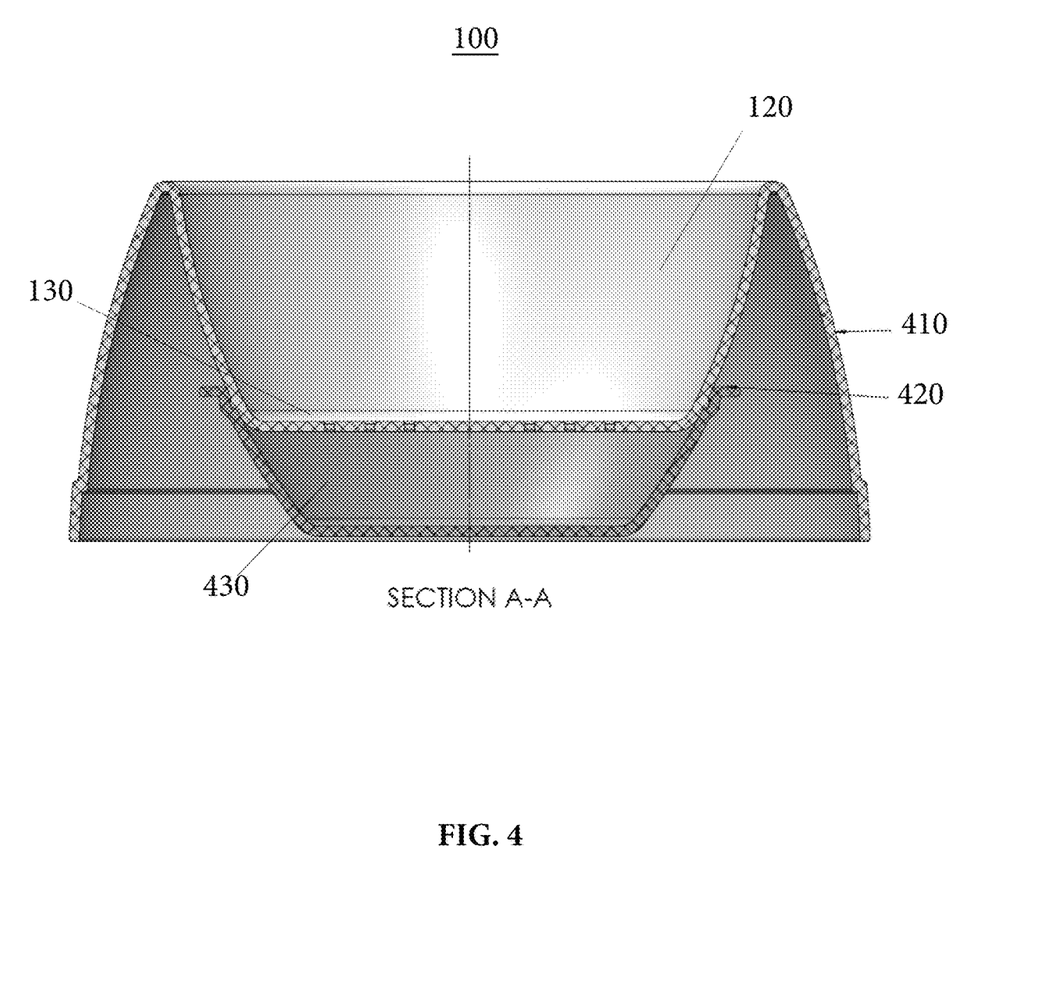
FIG. 4 is a cross-sectional side view of the pet food container, showing a hidden aromatic compartment, according to one embodiment.

FIG. 4 is a cross-sectional side view of the pet food container 100, showing the hidden (aromatic) lower compartment 430 (i.e., lower portion of the pet food container 100), according to one embodiment. The upper bowl 410 is shown connected to the lower bowl 420. In one embodiment, the lower compartment 430 that holds the attractant food may be attached to the inner container portion 120 by clasping, threaded to screw-on/off, slidable into a holder (e.g., tracks, grooves, etc.), snapped in place, a door-type of opening that swings open/closed, integrated (e.g., molded together as a single component), attached via welding (e.g., heat welding, adhesive, etc.), etc.

Figure 5:
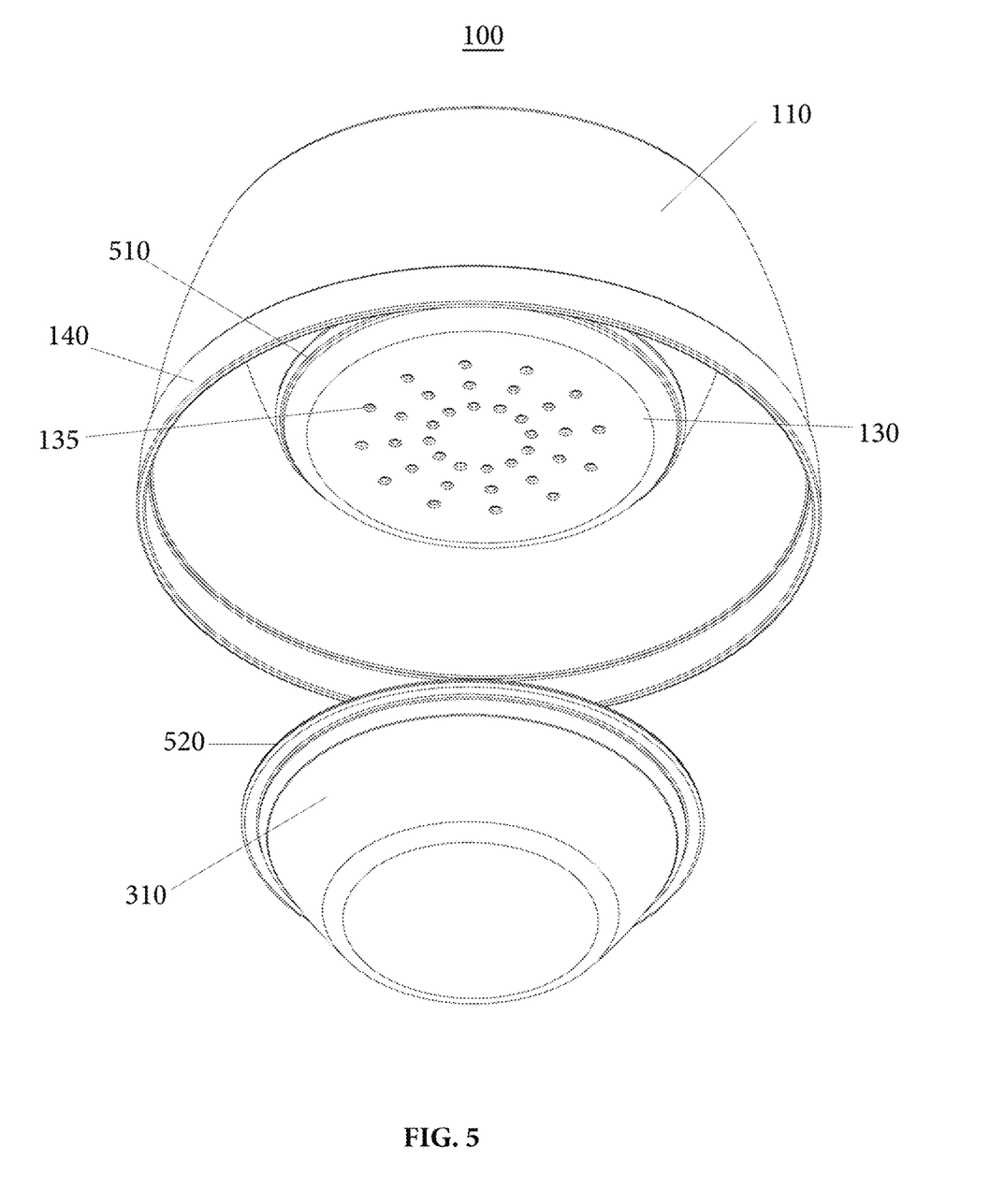
FIG. 5 is a bottom perspective exploded view of the upper bowl and lower bowl.

FIG. 5 is a bottom perspective exploded view of the upper portion (including the outer container portion 110, inner container portion 120 (FIG. 1) and footing portion 140) and lower bowl 310. As shown, in one example embodiment, the pet food container 100 upper portion includes threads 510 that are congruent with the lower bowl 310 threads 520 of the pet food container 100 such that the lower bowl 310 may be threaded onto the upper portion of the pet food container 100. In one or more embodiments, sealant material (e.g., an O-ring, seal, etc.) may be implemented to form a tight seal between the upper portion of the pet food container 100 and the lower bowl 310. In one embodiment, the lower bowl 310 may be made of a heavier material (e.g., denser, added weighting, etc.) than the upper portion to provide stability of the pet food container 100 (i.e., to assist in preventing flipping or tip-over of the pet food container 100).

In one embodiment, the lower bowl 310 of the pet food container may be integrated with the upper portion where the inner base portion 130 fits in a groove, track, congruent portion, etc. (i.e., to prevent the pet from dislodging the inner base portion 130) and is formed in the upper portion such that the attractant food may be placed in the lower bowl 310 of the pet food container 100 from the bottom of the pet food container 100 and then becomes covered when attached to the inner base portion 130, which includes the openings 135. In this embodiment, the inner base portion 130 may be removed such that the pet gains access to the attractant food or treats when desired.

Figure 6:
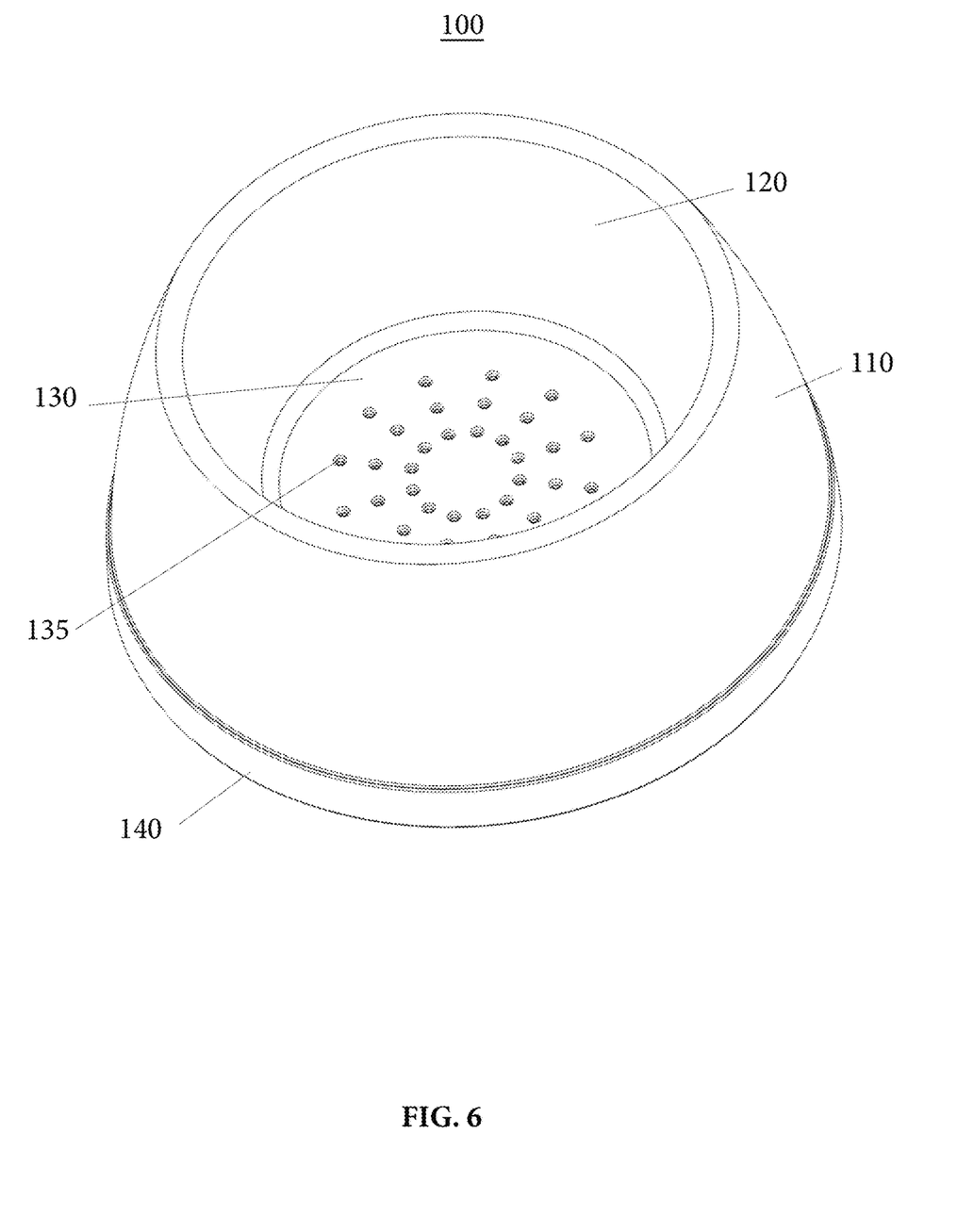
FIG. 6 is a top perspective view of the pet food container, according to one embodiment.

FIG. 6 is a top perspective view of the pet food container 100, according to one embodiment. As shown, the pet food container 100 appears as a typical pet food dish albeit the openings 135. In one embodiment, as liquid may enter through the openings 135, the lower bowl 310 (FIGS. 3 and 5) may include another compartment (not shown) with an upper portion with openings (similar to openings 135) for collecting liquid and keeping the collected liquid away from the attractant food or treats. In one embodiment, the additional compartment may be attached to the lower bowl 310 similarly as the lower bowl 310 is attached to the upper portion.

Figure 7:
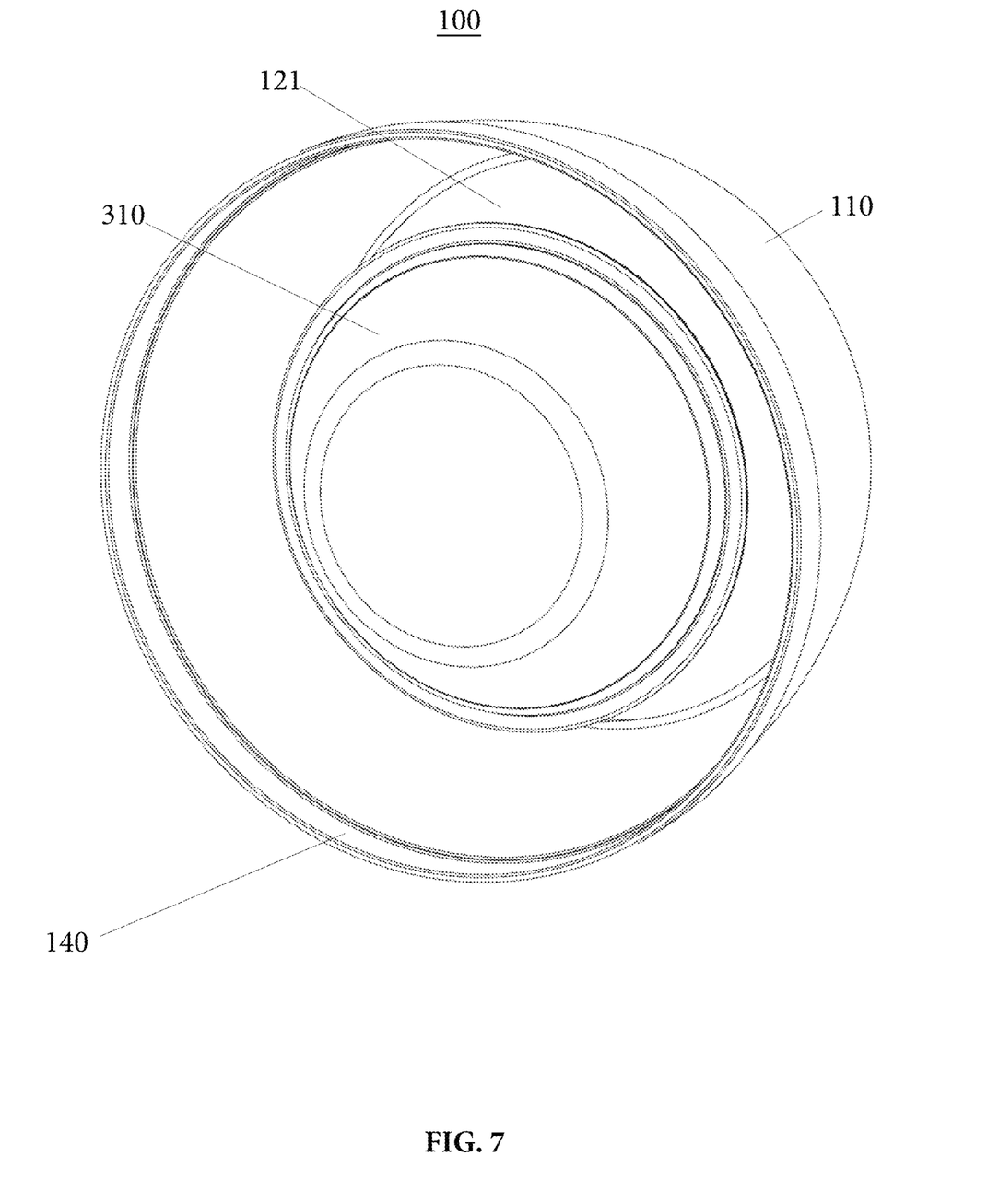
FIG. 7 is a perspective bottom view of the pet food container, according to one embodiment.

FIG. 7 is a perspective bottom view of the pet food container 100, according to one embodiment. As shown, in this view the lower bowl 310 of the pet food container 100 is attached to the upper portion of the pet food container 100. In this embodiment, when the pet food container 100 is turned over the attractant food or treats will not empty out of the lower bowl 310 of the pet food container 100.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A pet food container comprising:
   an upper bowl portion;
   a lower bowl coupled with the upper bowl portion, the lower bowl having an upper portion with a first diameter and a lower portion with a second diameter, wherein the first diameter is greater than the second diameter; and
   an inner base portion coupled between the upper bowl portion and the lower bowl, the inner base portion having a third diameter that is less than the first diameter, the third diameter is greater than the second diameter and less than the first diameter, wherein the inner base portion includes a plurality of openings;
   wherein the lower bowl is removably coupled with the upper bowl, the upper bowl having an internal portion disposed above the inner base portion, the internal portion including first threads for removably coupling with second threads of the lower bowl, and the lower bowl is covered under an external portion of the upper bowl.

2. The pet food container of claim 1, wherein the lower bowl is integrated with the upper bowl.

3. The pet food container of claim 1, wherein the inner base portion is removably coupled with the upper bowl portion.

4. The pet food container of claim 1, wherein the inner base portion is integrated with the upper bowl portion.

5. The pet food container of claim 1, wherein:
   the plurality of openings includes one or more of through-holes, slots, grooves, channels or a combination thereof;
   the first threads surround an external perimeter of the internal portion; and
   the second threads surround an internal perimeter of the lower bowl.

6. The pet food container of claim 5, wherein the lower bowl comprises a concealed aromatic or attractant compartment that provides for storage of pet food attractant, and the aromatic or attractant compartment is inaccessible by direct access.

7. The pet food container of claim 5, wherein the plurality of openings form one or more words or a design shape.

8. The pet food container of claim 1, wherein the upper bowl portion is coupled with a footing portion.

9. A pet food container comprising:
   an upper bowl portion including an inner base portion, the inner base portion including a plurality of opening; and
   a lower bowl removably coupled with the upper bowl portion;
   wherein:
   the lower bowl has an upper portion with a first diameter and a lower portion with a second diameter;
   the first diameter is greater than the second diameter;
   the inner base portion has a third diameter that is less than the first diameter; and
   the third diameter is greater than the second diameter and less than the first diameter;
   wherein:
   the upper bowl has an internal portion disposed above the inner base portion;
   the internal portion including first threads for removably coupling with second threads of the lower bowl; and
   the lower bowl is covered under an external portion of the upper bowl.

10. The pet food container of claim 9, wherein the inner base portion is removably coupled with the upper bowl portion.

11. The pet food container of claim 9, wherein the inner base portion is integrated with the upper bowl portion.

12. The pet food container of claim 9, wherein:
    the plurality of openings comprises one or more of through-holes, slots, grooves, channels or a combination thereof.

13. The pet food container of claim 12, wherein the lower bowl comprises a concealed aromatic or attractant compartment that provides for storage of pet food attractant, and the aromatic or attractant compartment is inaccessible by direct access.

14. The pet food container of claim 12, wherein:
    the plurality of openings form one or more words or a design shape;
    the first threads surround an external perimeter of the internal portion; and
    the second threads surround an internal perimeter of the lower bowl.

15. The pet food container of claim 9, wherein the upper bowl portion is coupled with a footing portion.

16. A pet food container comprising:
    an upper bowl portion including an inner base portion, the inner base portion including a plurality of openings, wherein the plurality of openings form one or more words or a design shape;
    a lower bowl removably coupled with the upper bowl portion; and
    a footing portion coupled to the upper bowl portion;
    wherein:
    the lower bowl has an upper portion with a first diameter and a lower portion with a second diameter;
    the first diameter is greater than the second diameter;
    the inner base portion has a third diameter that is less than the first diameter;
    the third diameter is greater than the second diameter and less than the first diameter;
    the upper bowl has an internal portion disposed above the inner base portion;
    the internal portion including first threads for removably coupling with second threads of the lower bowl; and
    the lower bowl is covered under an external portion of the upper bowl.

17. The pet food container of claim 16, wherein the inner base portion is removably coupled with the upper bowl portion.

18. The pet food container of claim 16, wherein the inner base portion is integrated with the upper bowl portion.

19. The pet food container of claim 16, wherein:
- the plurality of openings comprises one or more of through-holes, slots, grooves, channels or a combination thereof;
- the lower bowl comprises a concealed aromatic or attractant compartment that provides for storage of pet food attractant, and the aromatic or attractant compartment is inaccessible by direct access;
- the first threads surround an external perimeter of the internal portion; and
- the second threads surround an internal perimeter of the lower bowl.

\* \* \* \* \*